US008029925B2

United States Patent
Froeschl et al.

(10) Patent No.: US 8,029,925 B2
(45) Date of Patent: Oct. 4, 2011

(54) ELECTROCHEMICAL ENERGY STORAGE CELL

(75) Inventors: Joachim Froeschl, Herrsching (DE); Marcel Fenkart, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 960 days.

(21) Appl. No.: 11/514,944

(22) Filed: Sep. 5, 2006

(65) Prior Publication Data

US 2007/0054156 A1    Mar. 8, 2007

(30) Foreign Application Priority Data

Sep. 2, 2005 (DE) .................. 10 2005 041 746

(51) Int. Cl.
*H01M 10/50* (2006.01)
*H01M 14/00* (2006.01)
*H01M 2/04* (2006.01)
*H02J 7/00* (2006.01)
*B60W 10/04* (2006.01)
*H01G 9/00* (2006.01)

(52) U.S. Cl. ............ 429/61; 429/62; 429/7; 429/177; 429/178; 429/90; 429/120; 361/502; 320/116; 320/136; 180/65.29

(58) Field of Classification Search .............. 429/61.7, 429/92, 100, 99, 9, 54, 50, 20, 90, 97, 7, 429/177, 178, 62; 320/116, 136; 180/65.29
See application file for complete search history.

(56) References Cited

U.S. PATENT DOCUMENTS

| 3,016,413 | A | * | 1/1962 | DiPasquale et al. | 429/212 |
| 3,445,287 | A | * | 5/1969 | Scholzel | 429/53 |
| 5,399,446 | A | * | 3/1995 | Takahashi | 429/90 |
| 6,282,668 | B1 | * | 8/2001 | Neudecker | 713/324 |
| 2005/0079405 | A1 | * | 4/2005 | Enomoto et al. | 429/54 |

FOREIGN PATENT DOCUMENTS

| DE | 101 28 672 A1 | 12/2002 |
| EP | 0 936 691 A2 | 8/1999 |
| EP | 1 139 464 A2 | 10/2001 |
| EP | 1 160 893 A2 | 12/2001 |
| EP | 1160893 A2 * | 12/2001 |
| EP | 1 300 896 A1 | 4/2003 |
| EP | 1 321 989 A2 | 6/2003 |
| EP | 1321989 A2 * | 6/2003 |
| EP | 1 331 678 A2 | 7/2003 |
| SU | 974098 A * | 11/1982 |

OTHER PUBLICATIONS

English Abstract of: SU-974098 A, Krasilnik VB et al., Nov. 15, 1982.*
German Search Report for 10 2005 041 746.9 dated Dec. 12, 2005.

\* cited by examiner

*Primary Examiner* — Jonathan Crepeau
*Assistant Examiner* — Kenneth Douyette
(74) *Attorney, Agent, or Firm* — Crowell & Moring LLP

(57) ABSTRACT

An electrochemical energy storage cell is provided, in particular an accumulator or a double layer capacitor. In the energy storage cell a core tube, which is open on its two ends, runs through the energy storage cell. Leads may be disposed inside the core tube and gaseous decomposition products, issuing from the energy storage cell, may be vented through the core tube. Furthermore, a cooling of the energy storage cell may take place by way of the core tube. An electronic circuit arranged in the cell monitors parameters of the energy storage cell.

19 Claims, 2 Drawing Sheets

ELECTROCHEMICAL ENERGY STORAGE CELL

BACKGROUND AND SUMMARY OF THE INVENTION

The invention relates to an electrochemical energy storage cell, in particular to an energy store in a vehicle electrical system.

The automobile sector is increasingly using electrochemical energy stores, constructed of individual cells, preferably energy stores, constructed of double layer capacitors. When energy is stored and made available for use, these double layer capacitors offer the advantage that they may provide high performance for a short period of time. To arrive at the supply voltage required in a motor vehicle, the individual energy storage cells are connected in series. The technical aspects of double layer capacitors, such as their construction and manufacture, are comparable to those of batteries, especially lithium ion batteries. The materials that are used are similar to some extent. It involves predominantly monopolar arrangements, in which the electrodes are wound or stacked.

As a rule, the liquid electrolyte decomposes over the lifetime of the energy storage cells; and gaseous decomposition products are generated. This applies especially under the additional influence of higher temperatures, as is the case in motor vehicles. As a rule, the decomposition products are collected in the energy storage cell or an arrangement of several energy storage cells and vented to the atmosphere via a venting hose. Such a device has already been disclosed in DE 101 28 672 A1. Owing to the tolerances of the cells, the cell voltages diverge in the course of cyclic charging and discharging. This is critical, above all, when the maximum cell voltage is reached. The consequences extend from differential ageing of the cells up to the failure of individual cells. Furthermore, series-connected electrochemical energy storage cells exhibit a non-uniform distribution of voltage over the individual cells owing to the different internal resistances and/or the different capacities of the individual cells. Electronic circuits may be used to avoid overvoltages when charging and discharging. Such electronic circuits range from simple compensating resistors to totally active circuits, which are provided, as a rule, once per cell and once in an overreaching manner for a cell arrangement.

Both the electrical connection of the individual electrochemical energy storage cells and their respective monitoring logic, as well as the collection of the gaseous decomposition products and their venting into the atmosphere, represent a problem when a large number of electrochemical energy storage cells are wired together.

Therefore, the object of the invention is to provide an alternative construction of an electrochemical energy storage cell, which makes possible both a simple electrical connection as well as a simple venting of the resulting gaseous decomposition products in series-connected electrochemical energy storage cells.

The invention solves this problem by means of an electrochemical energy storage cell that exhibits a core tube, which passes through the energy storage cell and is open on its two ends.

As a consequence, the invention offers the possibility of integrating into the core tube not only one or more connections for supplying or dissipating energy and a databus structure for linking the individual cells together in an intelligent manner, but also provides a channel for siphoning off any electrolytes that may have become liberated. The result is that a simple cascading/series connection of the individual cells is possible.

Advantageous further developments and embodiments of the invention are described and claimed herein.

Preferably, the core tube forms a connection lead of the energy storage cell. In this case, the supply/dissipation of electric power and/or the databus structure may be realized by means of merely one additional lead to the core tube. To this end, the electrochemical energy storage cell exhibits preferably a conducting exterior housing, which is electrically insulated at least against the core tube, and/or at least one lead, which is arranged in the core tube and which also includes preferably at least one connection lead of the energy storage cell.

In the electrochemical energy storage cell, according to the invention, the core tube and/or at least one lead, arranged in the core tube, comprise/comprises at least one lead of a databus. The databus may also be integrated in the connection lead for supplying and dissipating energy.

The inventive electrochemical energy storage cell, which exhibits at least one lead, arranged in the core tube, includes preferably at least one guide element for the at least one lead, which is arranged in the core tube and by which the core tube is not closed. In this case, the electrochemical energy storage cell, according to the invention, may be cooled with air or liquid via the core tube. Furthermore, it is also possible to siphon off any electrolytes, which might have become liberated, through the core tube.

Preferably, the electrochemical energy storage cell, according to the invention, exhibits an electronic circuit for controlling, regulating and/or monitoring the energy storage cell. Owing to such an electronic circuit, which is also preferably an electronic slave, controlled by an electronic master, both the overvoltages and a diverging of the cell voltages during cyclic charging and discharging may be avoided. Furthermore, the consequence of such an electronic circuit is a temperature monitoring of the cell, the core tube and/or the channel, which is formed by said core tube; a voltage monitoring of the cell and/or the connection leads; and/or a current monitoring of the cell. Furthermore, it is also possible that the result of such an electronic circuit is a pressure monitoring of the cell and/or the core tube; a measurement of the throughflow of gas or a gas mixture, present in the core tube; and/or a monitoring of the occurrence of a (specific) gas or gas mixture, present in the core tube.

The electrochemical energy storage cell, according to the invention, exhibits preferably at least one overpressure valve, leading into the core tube. The consequence of this overpressure valve is that gaseous decomposition products of the electrochemical energy storage cell may be conveyed specifically into the core tube and vented safely and simply into the atmosphere. Furthermore, this venting into the atmosphere is done preferably by way of an activated charcoal filter and/or a molecular sieve for trapping at least a fraction of the decomposition products.

The inventive electrochemical energy storage cell exhibits preferably at least one cooling rib, arranged in the core tube. In the event that the inventive energy storage cell also exhibits a guide element for the at least one lead, arranged in the core tube, the at least one cooling rib is also formed in an integrated manner preferably with the guide element. The result of the at least one cooling rib, arranged in the core tube, is that the core tube may also be subdivided into a plurality of channels that may have different functions, for example, a channel for venting gaseous decomposition products of the energy storage cell, a channel for cooling the fluid, a channel for guiding the electrical lines, etc.

The electrochemical energy storage cell, according to the invention, includes preferably at least one sensor for measuring a cell temperature, a temperature in the core tube, a cell voltage, a voltage of the connection lead of the cell, a current taken from the cell, a pressure in the cell, a pressure in the core tube, a throughflow of a gas or a gas mixture present in the core tube, and/or a chemical composition or the occurrence of a (specific) gas or gas mixture present in the core tube.

The inventive energy storage cell is preferably an accumulator or a double layer capacitor.

Other details, advantages and features of the present invention are disclosed in the following description of the embodiments with reference to the drawings.

BRIEF DESCRIPTION OF THE DRAWING FIGURES

DETAILED DESCRIPTION OF THE DRAWINGS

Figure 1:
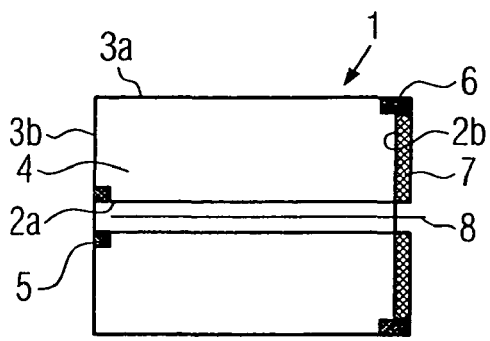
FIG. 1 is a schematic view of an electrochemical energy storage cell, according to a first preferred embodiment of the invention.

FIG. 1 depicts an electrochemical energy storage cell 1, according to a first preferred embodiment of the invention. In this case, the depicted energy storage cell consists of a double layer capacitor 4, which is arranged in a two-part housing 2, 3. In particular, the housing 2, 3 has an exterior section 3, which includes an outer tube 3a with an outer cover 3b; and an interior section 2, which includes a core tube 2a with an inner cover 2b. The exterior section 3 and the interior section 2 are connected together in such a manner that the core tube 2a is arranged coaxially inside the outer tube 3a; and the outer cover 3b is connected by way of an inner seal 5 to that end of the core tube 2a, on which the inner cover 2b is not provided. The inner cover 2b of the interior section 2 is connected by way of an outer seal 6 to that end of the outer tube 3a, on which the outer cover 3b is not arranged.

In this manner, the housing forms a double walled hollow cylinder, in which a cavity, which is closed by the outer cover 3b and the inner cover 2b and in which the double layer capacitor 4 is disposed, is formed between the walls. The inner seal 5 and the outer seal 6 also cause the interior section 2 to be electrically insulated from the exterior section 3, the result of which is that connections for the supply of energy or dissipation of energy may be formed by means of the interior section 2 and the exterior section 3. The core tube 2a is open toward the outside; and the core tube 2a has a lead 8. Electronics 7 are mounted on the inner cover 2b on the exterior. Owing to the electronics, the double layer capacitor may be controlled or regulated, charged or discharged. Moreover, the electronics monitor a number of different parameters of the double layer capacitor, such as the parameters of its temperature; of the temperature inside the core tube 2a; of the pressure inside the housing 2, 3; a flow rate of a gas or a gas mixture, transported through the core tube 2a; a tightness of a channel, formed by way of the core tube 2a and other elements attached to the core tube; etc. The electronics 7 may be accessed via a databus, which may also transfer information to the electronics 7. With this information the electronics may check the line. Furthermore, the electronics 7 may also be connected to other energy storage cells by means of suitable connections, which may be disposed in the core tube 2a, for the purpose of controlling, regulating and/or monitoring the energy storage cells.

Figure 2:
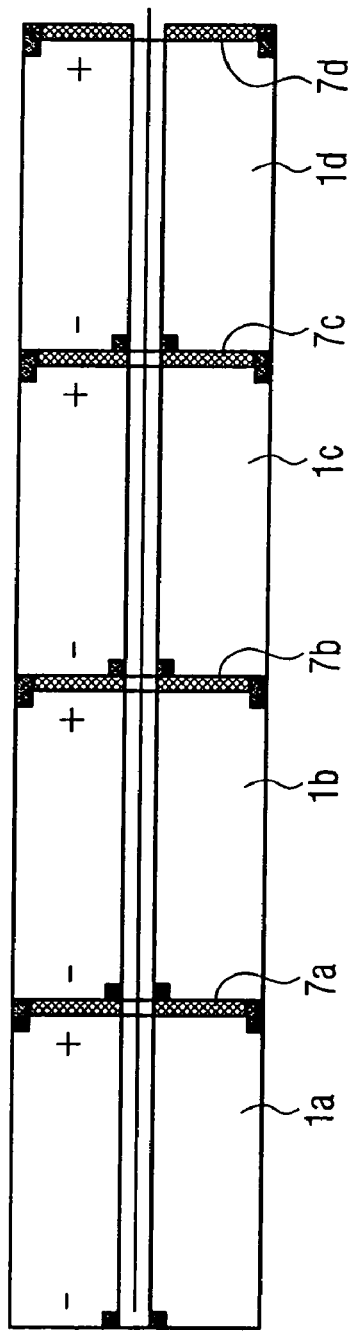
FIG. 2 is a schematic view of a cascading of electrochemical energy storage cells, shown in FIG. 1.

FIG. 2 depicts a cascading of energy storage cells 1, according to the first preferred embodiment of the invention. In this case, there are a series of four double layer capacitors 1a to 1d. Therefore, the exterior section of the housing forms a negative terminal; and the interior section of the housing forms a positive terminal of the energy storage cells. The individual cells 1a to 1d are arranged in a row or stacked one on top of the other such that a sealed channel is formed by way of the core tubes. Therefore, a core tube, forming a positive terminal of an individual cell, is connected to an outer cover 3b, which forms a negative terminal of the individual cell and belongs to a neighboring individual cell. In this way the individual cells 1a to 1d are connected together in series. Therefore, an electrical insulation of the core tubes of the adjacent individual cells takes place via the inner seal 5; and an electrical insulation of the outer tubes of the adjacent individual cells takes place via the outer seal 6. The tightness of the channel, formed by means of the core tubes, may be monitored by monitoring the pressure of the channel, which may ensue by use of the electronics of an individual cell. This may occur, for example, via a monitoring of an underpressure, which has built up in the channel. As an alternative, it is also possible, among other things, to monitor the tightness of the channel by way of determining the flow rate at the beginning and the end of the channel.

The individual electronics 7a to 7d of the individual cells 1a to 1d are constructed, for example, such that the electronics 7a to 7c of the individual cells 1a to 1c are slave circuits; and the electronics 7d of the individual cell 1d is a master circuit that controls the slave circuits 7a to 7c. A connection to the electrical system of a vehicle, for example to the supply voltage and a databus, may also ensue by way of the master circuit 7d. As stated above, a slave circuit may also serve more than one individual cell.

Figure 3:
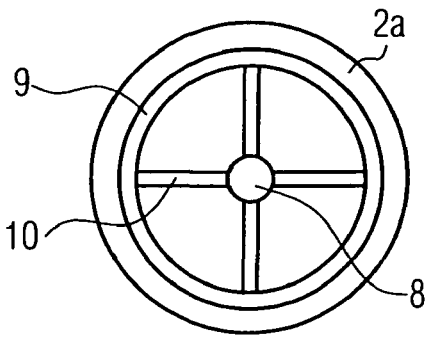
FIG. 3 is a top view of the core tube of the electrochemical energy storage cell, shown in FIG. 1.

FIG. 3 is a top view of the core tube 2a of the energy storage cell, shown in FIG. 1. The core tube 2a, which in this case is constructed in a non-conducting manner, exhibits an outer lead 9 on its inside wall and an inner lead 8, which is disposed coaxially to said outer lead and is held by way of the guide legs 10, which in this embodiment also serve as the cooling ribs. The guide legs 10 may be disposed along the entire core tube 2a or only in parts thereof. In the event that the guide legs 10 run along the entire core tube 2a, the guide legs/cooling ribs 10 may form closed individual channels, for example a channel for conveying a cooling fluid, a channel for siphoning off gaseous decomposition products of the double layer capacitor, a channel for running other leads and a channel for accommodating sensors, for example temperature sensors.

Figure 4:
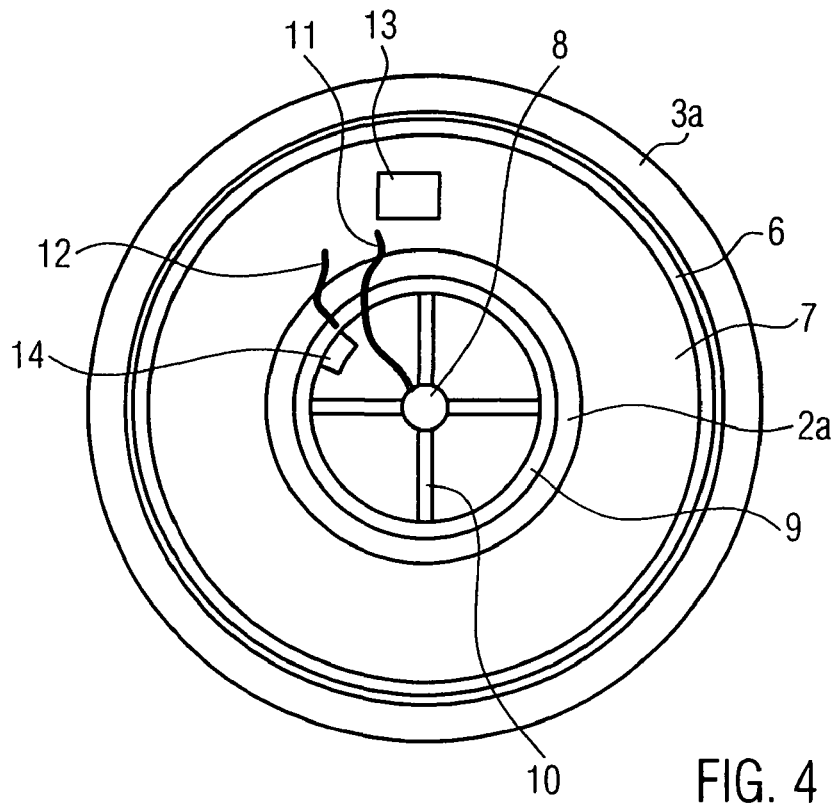
FIG. 4 is a top view of the electrochemical energy storage cell, shown in FIG. 1.

FIG. 4 is a top view of the energy storage cell, including the electronics 7, shown in FIG. 1. From radially outward to inward one can see: the outer tube 3a, the outer seal 6, the electronics 7, the core tube 2a, the outer lead 9, the guide legs/cooling ribs 10 and the inner lead 8. Inside the outer lead 9 there is also a temperature sensor 14, by which the temperature inside the core tube 2a may be measured. On the electronics 7 there is another temperature sensor 13, by which the temperature inside the energy storage cell (that is, the temperature of the double layer capacitor 4) may be measured. The electronics 7 are connected by way of a first connection lead 11 to the center lead 8 and by way of a second connection lead 12 to the outer lead 9. These two leads form the databus, by which the electronics may be actuated.

Figure 5:
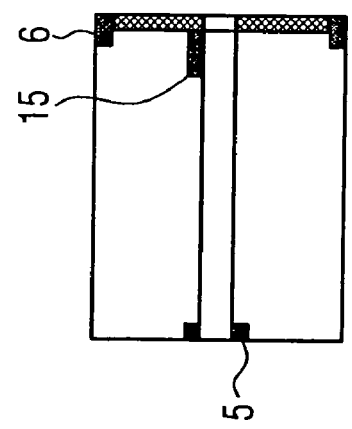
FIG. 5 is a view of an electrochemical energy storage cell, according to a second preferred embodiment of the invention.

FIG. 5 depicts an electrochemical energy storage cell, according to a second embodiment of the invention, which differs from the energy storage cell of the first embodiment in that there is an additional overpressure valve 15. The overpressure valve 15 is arranged in such a manner that it vents an overpressure, generated in the closed interior of the housing, into the core tube 2a. The overpressure valve 15 may comprise a valve, which automatically closes again after the overpressure has been reduced, or just merely a pressure relief joint.

The core tube 2a may have a chemical sensor technology, which detects the gaseous decomposition products of a double layer capacitor, the decomposition products being vented into the core tube 2a. Therefore, the electronics of the cell may indicate any necessary replacement.

Table of Reference Numerals
1 energy storage cell
2a core tube
2b inner cover
3a outer tube
3b outer cover
4 double layer capacitor
5 inner seal
6 outer seal
7 electronics
8 inner lead
9 outer lead
10 guide legs/cooling ribs
11 inner lead connection
12 outer lead connection
13 temperature sensor (cell)
14 temperature sensor (core tube)
15 overpressure valve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrochemical energy store comprising an energy storage cell, the energy storage cell comprising:
    a housing formed by an outer tube and an outer cover and a core tube and an inner cover, the core tube extending through the energy storage cell and being open at both ends and electrically insulated from the outer tube;
    an electronic circuit arranged on the inner cover, the electronic circuit being operatively configured to at least one of control and monitor the energy storage cell; and
    at least one cooling rib arranged in the core tube, wherein
        the outer tube is electrically connected to the outer cover and at least one of the outer tube and the outer cover is in electrical communication with an energy storage material within the energy storage cell such that the outer cover serves as a first terminal of the energy storage cell,
        the core tube is electrically connected to the inner cover and at least one of the core tube and the inner cover is in electrical communication with the energy storage material within the energy storage cell such that the inner cover serves as a second terminal of the energy storage cell,
        the inner cover extends transversely from the inner tube at one end of the energy storage cell and the outer cover extends transversely from the outer tube at an other end of the energy storage cell,
        the outer cover and the inner cover are configured to allow serial conduction of energy between adjacent energy storage cells, and
        the at least one cooling rib divides an interior region into at least two channels.

2. The electrochemical energy store according to claim 1, wherein the electronic circuit monitors a temperature of at least one of the energy storage cell, the core tube, and a channel formed by an interior of the core tube.

3. The electrochemical energy store according to claim 1, wherein the electronic circuit monitors at least one of a voltage of the energy storage cell, a voltage of connection leads of the cell, and a current of the cell.

4. The electrochemical energy store according to claim 1, wherein the electronic circuit monitors a pressure of at least one of the energy storage cell and the core tube.

5. The electrochemical energy store according to claim 1, wherein the electronic circuit measures a throughflow of a gas or gas mixture present in the core tube.

6. The electrochemical energy store according to claim 1, wherein the electronic circuit monitors an occurrence of a specific gas or gas mixture in the core tube.

7. The electrochemical energy store according to claim 1, wherein the electronic circuit comprises at least one sensor for measuring at least one of a cell temperature, a temperature in the core tube, a cell voltage, a voltage of a connection lead of the cell, a current taken from the cell, a pressure in the cell, a pressure in the core tube, a throughflow of a gas or a gas mixture present in the core tube, and a chemical composition or occurrence of a gas or gas mixture present in the core tube.

8. The electrochemical energy store according to claim 1, wherein the core tube forms a connection lead of the energy storage cell.

9. The electrochemical energy store according to claim 1, wherein the core tube and/or at least one lead arranged in the core tube, comprise at least one lead of a databus.

10. The electrochemical energy store according to claim 1, further comprising at least one guide element for at least one lead, which is arranged in the core tube and by which the core tube is not closed.

11. The electrochemical energy store according to claim 1, wherein the at least one cooling rib arranged in the core tube to divide the interior region is configured to seal the at least two channels from one another.

12. The electrochemical energy store according to claim 1, further comprising at least one overpressure valve leading into the core tube.

13. The electrochemical energy store according to claim 1, wherein the energy store cell is one of an accumulator and a double layer capacitor.

14. The electrochemical energy store according to claim 1, further comprising:
    at least one additional energy storage cell arranged in series on the energy storage cell;
    a sealed channel being formed by the core tube of each energy storage cell;
    inner and outer seals of the energy storage cell and the additional energy storage cell electrically insulating the core tubes and outer tubes of the adjacent cells.

15. The electrochemical energy store according to claim 14, wherein the electronic circuit of one energy storage cell operates as a slave circuit and the electronic circuit of another cell operates as a master circuit.

16. The electrochemical energy store according to claim 15, wherein the master circuit is coupled to an electrical system of a vehicle.

17. The electrochemical energy store according to claim 16, wherein the electrical system of the vehicle includes a vehicle supply voltage and a databus.

18. The electrochemical energy store according to claim 14, wherein at least one of the electronic circuits of the energy storage cell and the additional energy storage cell monitors a tightness of the sealed channel formed by the core tubes.

19. The electrochemical energy store according to claim 14, wherein four energy storage cells each being one of an accumulator or double layer capacitor, are arranged in series.

* * * * *